April 28, 1959 — L. S. BLUTH — 2,883,899
RETAINING RING OF UNIFORM SECTION HEIGHT WITH MEANS PROVIDING FOR CIRCUMFERENTIAL BENDING AND METHOD OF MAKING SAME
Filed Nov. 12, 1957
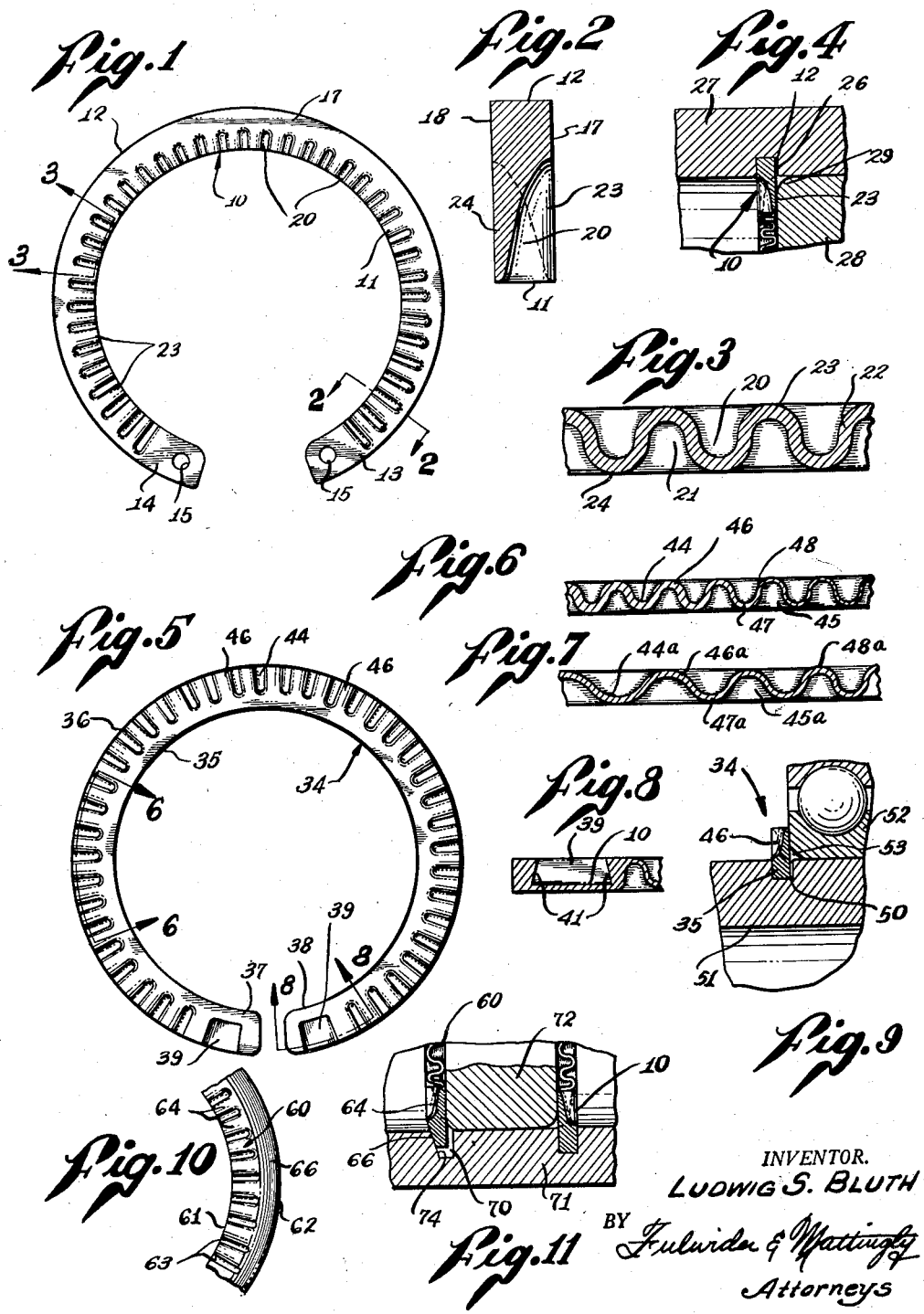
INVENTOR.
LUDWIG S. BLUTH April 28, 1959             L. S. BLUTH                      2,883,899
RETAINING RING OF UNIFORM SECTION HEIGHT WITH
MEANS PROVIDING FOR CIRCUMFERENTIAL
BENDING AND METHOD OF MAKING SAME
Filed Nov. 12, 1957                                          2 Sheets-Sheet 2
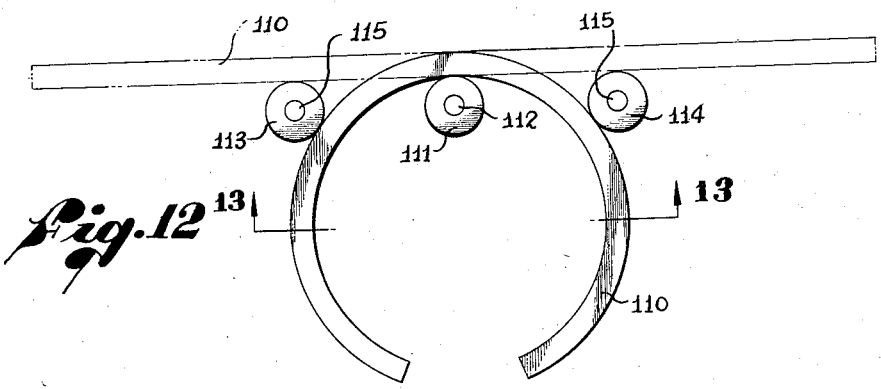
Fig. 12
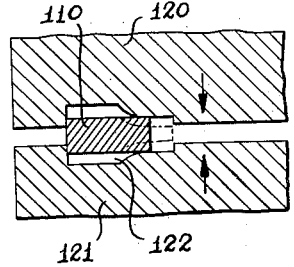
Fig. 14
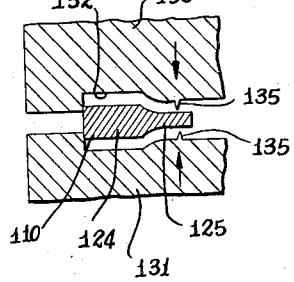
Fig. 15
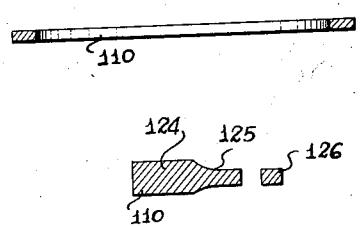
Fig. 13
Fig. 16
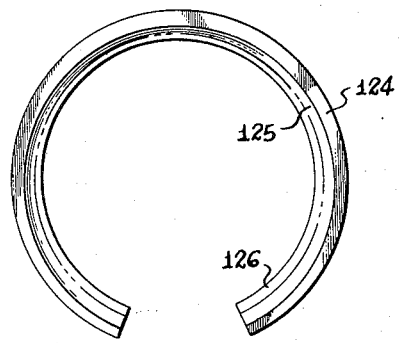
Fig. 17
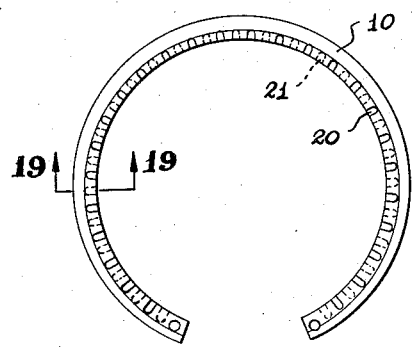
Fig. 18
Fig. 19
INVENTOR.
LUDWIG S. BLUTH
BY
Attorneys United States Patent Office 2,883,899
Patented Apr. 28, 1959

2,883,899

RETAINING RING OF UNIFORM SECTION HEIGHT WITH MEANS PROVIDING FOR CIRCUMFERENTIAL BENDING AND METHOD OF MAKING SAME

Ludwig S. Bluth, Los Angeles, Calif.

Application November 12, 1957, Serial No. 695,775

9 Claims. (Cl. 85—8.8)

My invention relates generally to retaining rings for securing machine parts such as bearing races, gears, and the like against axial displacement on shafts or in housings, and more particularly to an improved spring retaining ring which allows a range of dimensional relationships which have not heretofore been possible. This application is a continuation-in-part of my application Serial No. 648,118 filed March 25, 1957, for Retaining Ring of Uniform Section Height With Means Providing for Circumferential Bending and Method of Making Same which in turn is a continuation of my application Serial No. 262,318 filed December 18, 1951, and now abandoned, for Retaining Ring of Uniform Section Height With Means Providing for Circumferential Bending.

Conventional retaining rings of uniform section height and equal thickness throughout have a non-uniform bending moment acting around the circumference thereof when compressed or expanded. Consequently, they tend to deform ovally under peripheral deflection so that when sprung into the retaining groove of the shaft or housing they do not exert a uniform pressure against the bottom of the groove.

To overcome such non-circularity, rings with a mid-section of greatest height and diminishing section height toward the open ends have been developed. These rings have peripheral edges eccentric to each other and convergent toward the open ends on a taper which is calculated to provide a uniform circumferential bending moment. Accordingly, they are not deformed under deflection and have a uniform pressure fit against the bottom of the retaining groove so long as the deflection does not exceed the elastic limit of the material.

However, in both of the above types of rings, there is a limiting ratio between the section height and the ring thickness which cannot be exceeded without the ring taking a permanent set during deflection. For rings of uniform section height, the ratio of height to thickness is approximately 2:1. On rings of non-uniform height the ratio may be increased to approximately 3:1 at the mid-section. If these ratios are exceeded, the radial length of sectional area on each side of the neutral axis of the ring becomes substantially greater than the thickness of the ring, and there is a proportional increase in the compression and tension loads upon peripheral deflection which causes permanent deformation.

The result is that the rings must be seated within relatively shallow grooves in order to provide an area for shouldering against the machine part, and even then the shoulder height may be less than is desirable. This is particularly disadvantageous in the case of a non-uniform section height ring, for at its narrowest section there is little or no shoulder available to abut the machine part and the thrust load capacity is reduced.

Furthermore, even if the ring is designed within the accepted dimensional ratios, there is a maximum permissible deflection beyond which the ring will take a permanent set. According to available literature on retaining rings of nonuniform section height, the permissible deflection is 10% of the ring diameter. This limitation upon the flexibility of the ring of course reflects itself as a design limitation upon the range of applications of the ring and is highly undesirable.

The present invention contemplates a split or open-ended ring having concentric circular edges and therefore a uniform section height. However, the ring is not of uniform wall thickness throughout but has an annular portion of reduced mass adjacent one edge of the ring. Such annular portion is of uniform overall thickness but is of reduced wall thickness by the provision of recesses, serrations, corrugations or the like, which extend radially along the faces of the ring. The remaining annular portion of the ring extending to the other peripheral edge is a solid block of material having unbroken faces.

In a typical illustrative ring of the internal type, the outer rim of the ring is unbroken and the faces of the inner rim are serrated. Correspondingly, an external type of ring has serrated faces on the outer rim and unbroken faces on the inner rim. As can be appreciated, the shape, number, pitch, wall thickness and depth of the individual serrations are variable within wide limits to provide particular characteristics.

The serrated portion of the ring is formed typically of alternate ridges and grooves in staggered complemental relationship to define a sinusoidal or corrugated edge wall of reduced thickness. Each corrugation represents a bellow-like spring tied at one end to the solid section of the ring and the collective flexibility of these spring members is much larger than the flexibility of a corresponding solid section. As a result of the rearranged stresses, the neutral axis shifts far into the solid seciton. Thus, the sectional height of the solid areas about the neutral axis which are under tension and compression is substantially reduced and the flexibility of the solid section is increased proportionally. A deflection of much more than ten percent is now permissible without the ring taking a permanent set. Furthermore, because of the increased flexibility a greater ratio of section height to thickness is possible.

Utilizing my invention makes it also possible to vary the number and the pitch of the corrugations, their wall thickness or their radial depth. Either by one only or by a combination of several variations the ring may be provided with a uniform circumferential bending moment while maintaining a uniform overall section height around the circumference to abut the machine part to be held in place.

With the foregoing in mind, it is an important object of my invention to provide a retaining ring shaped to allow an increased ratio of section height to thickness. This permits an increase in groove depth and at the same time an increased shoulder to bear against the machine part. The compression load per square inch upon the groove wall is reduced and the shock and impact resistance of the ring is increased proportionately. Because of the reduced compression load upon the groove wall the ring can be used under shock and impact conditions even on shafts and housings made of comparatively soft material. This is particularly advantageous in the aircraft industry where light alloys are used extensively.

In actual operation, retaining rings are mostly stressed primarily in bending rather than in shear. All of the corrugation ridges around the ring are available to share such loads. Each ridge may be sectionally profiled to represent a cantilever beam having its greatest wall thickness at the root and consequently, the strength of the individual ridge increases in proportion to an increased bending moment acting thereon. The increase in active shoulder area consisting of a number of cantilever beams makes possible a larger thrust load capacity and maximum resistance to bending and impact.

An equally important object of my invention is to provide a ring of uniform section height having the uniform circumferential bending moment which has heretofore been characteristic only of a non-uniform section height ring. Thus, the entire periphery of the ring equally shares a load exerted thereon.

It is another object of my invention to provide a ring of reduced weight which can be balanced centrifugally for high speed rotation without any change in the overall dimensions by the selective shifting of mass within the solid and the corrugated areas.

A further object of my invention is to provide a retaining ring design which permits variations for greater flexibility or thrust load capacity without change in the overall dimensions by changing either the number, pitch, shape, wall thickness, or radial length of the individual corrugations, or the ratio between the solid and corrugated portions.

It is also an object of my invention to provide a retaining ring of the beveled rim type for eliminating end play which has greater take-up due to the increase in section height and groove depth. Larger bevel angles may be used for special application, and within the same overall dimensions the ring may have varying amounts of take-up, and greater or lesser thrust load capacity.

Still another object of the invention is to provide a method of manufacturing a ring of the character described which employs a series of relatively simple forming operations.

A still further object of the invention is to provide a method and apparatus for forming a retaining ring which is economical in the use of material and is adapted to be varied for producing rings of different sizes and types.

These and other objects and advantages of my invention will become apparent from the following detailed description of typical embodiments thereof, and from an inspection of the accompanying drawings, in which:

Fig. 1 is a side elevation of a representative form of my invention designed for use as an internal-type retaining ring;

Fig. 2 is a radial section taken along the line 2—2 of Fig. 1 showing the sectional profile and cross-section of a preferred design of serrated wall;

Fig. 3 is an edge view of the serrated rim taken along the arc 3—3 of Fig. 1;

Fig. 4, is a cross-sectional detail illustrating the installation of the internal-type ring within a housing groove and abutting a machine part;

Fig. 5 is a side elevation of an external type of retaining ring constructed in accordance with my invention;

Fig. 6 is an edge view of a different form of serrated rim taken along the arc 6—6 of Fig. 5;

Fig. 7 is an edge view similar to Fig. 6 showing another form of serrated rim;

Fig. 8 is an edge view of a tool-engaging socket taken along the arc 8—8 of Fig. 5;

Fig. 9 is a cross-sectional detail illustrating the installation of the external-type ring within a shaft groove and abutting a machine part;

Fig. 10 is an elevational segment of a modified type of internal ring constructed according to my invention and having a beveled rim for end play take-up;

Fig. 11 is a cross-sectional detail showing the modified ring seated within a housing groove and abutting a machine part;

Fig. 12 is a schematic view of the apparatus for bending a continuous strip of stock into the desired circular shape;

Fig. 13 is a cross-sectional view taken along the line 13—13 of Fig. 12 showing the partially formed ring;

Fig. 14 is a simplified sectional view of swaging dies for further shaping of the ring blank;

Fig. 15 is a view similar to Fig. 14 showing a trimming die for removing the excess material;

Fig. 16 is a sectional view illustrating the removal of edge material from the ring;

Fig. 17 is a plan view of the semi-finished ring with the portion of excess material which is removed shown in shaded outline;

Fig. 18 is a plan view of the finished ring with the serrations formed therein along one peripheral edge; and Fig. 19 is a typical cross-sectional view taken along the line 19—19 of Fig. 18.

Referring now to the drawings and particularly to Fig. 1 thereof, the numeral 10 designates generally an internal-type retaining ring for use in a groove formed in the wall of a housing cylinder of the like. Ring 10 is of annular shape having inner and outer peripheral edges 11 and 12, respectively, which are circular and concentric with each other. Thus, the ring is characterized by a uniform section height taken across any radial plane throughout its circumference. To permit peripheral deflection, ring 10 has an open segment between free end portions 13 and 14, and is formed of spring steel or other suitable elastic metal. Thus, the ring may be compressed and then sprung outwardly to seat within a retaining groove. Within each end portion 13 and 14, a conventional type of opening 15 is provided for receiving the points of a tool operable to compress the ring for installation.

As is seen in Fig. 2, the ring is of overall rectangular cross-section having parallel opposed side faces 17 and 18 which determine the thickness of the ring. The outer rim portion adjacent edge 12 is of the given thickness of the ring while the inner portion adjacent edge 11 is of reduced wall thickness to effect a reduction in mass of that portion of the rim. Referring to Fig. 1, it can be seen that a plurality of recesses or serrations 20 are extended radially along the facial surface 17 in a generally annular area which is contiguous to the edge 11. Similarly, the opposite face 18 has corresponding staggered serrations 21 (seen in Fig. 3).

While I have illustrated a preferred design of serration, it is to be emphasized that the basic purpose of this form of construction is to reduce the effective wall thickness of the inner rim portion of the ring to thereby increase the relative flexibility. Thus, when I refer to the serrated faces of the ring, I wish to include a facial surface which is broken by recesses, grooves, corrugations, saw teeth or the like. Preferably, the serrations 20 and 21 take the form of radially extending round bottom grooves which are staggered alternately upon the opposite faces 17 and 18 to define a sinusoidal or corrugated wall 22 of reduced thickness.

As is seen in Fig. 3, the wall 22 may be considered with reference to the face 17, as comprising alternate grooves 20 and ridges 23, with the latter being internally recessed by the opposite grooves 21. Similarly, ridges 24 on the other face of the ring are spaced between the grooves 21. The ridges and grooves extend radially with respect to the axis of the ring and are profiled as shown in Fig. 2, which is illustrative of a section taken radially through one groove 20 of the ring. The wall 22 is of gradually decreased thickness toward the tip end of the ridges 23 and 24, and is designed in accordance with engineering principles to represent a cantilever beam having its greatest strength at the root and a decreasing strength toward the tip. In this manner, the ridges offer maximum resistance to bending without the use of excess material, and are able to withstand combined bending and shear loads. The internal profile of the ridge 24 is shown in the section taken, and the opposite ridge 23 is profiled in a corresponding manner as shown in phantom outline.

When the ring 10 is peripherally deflected, as for example during compression, the outer rim portion of the ring is placed under tension while the inner portion is placed under a compression load. The neutral axis of the ring extends around the ring intermediate the inner and outer rim and determines the locus of points which are under neither tension nor compression. As can be understood, the size of the compression or tension force acting to deform the material of the ring increases in direct proportion to the radial height of the ring section on either side of the neutral axis. Hence, as aforementioned, there is a limiting ratio between section height and thickness which is approximately 2:1 for a conventional ring of uniform section height.

Because of the reduced thickness of the inner wall portion 22, the neutral axis of the ring 10 is shifted outwardly with respect to the axis of a conventional ring and the compression and tension loads in the remaining portion of the ring are proportionately decreased. The wall 22 itself corresponds to a plurality of individual bellow-like springs tied to the solid rim at their root ends. This portion of the ring is extremely flexible and therefore has to withstand only small tension and compression loads. Accordingly, I am now able to increase the ratio of section height to thickness without placing undue compression and tension loads on the ring during peripheral deflection. Likewise, the maximum deflection may be much greater without causing the ring to take a permanent set.

In order to provide a ring having a uniform circumferential bending moment while retaining a uniform section height throughout the ring, I vary the length or radial depth of the grooves 20 and 21 in this form of the invention, so as to remove a greater amount of material approaching the free ring ends 13 and 14. Thus, the root ends of the grooves 20 and 21 are determined by a root circle which is eccentric to the peripheral edges 11 and 12 and converges towards the outer rim 12 in the direction of the free end portions 13 and 14, causing the grooves to be shortest at the mid-section and longest at the free ends of the ring. Preferably, the grooves 20 and 21 are not formed in the terminal portions of the ends 13 and 14 in order that the tool openings 15 may be provided without a reduction in strength.

An important advantage of my invention lies in the fact that the ring may be designed for greater flexibility or thrust load capacity without changing the overall dimensions of the ring. This may be done by variations in the number, pitch, shape, wall thickness, or radial length of the individual grooves and ridges, or the ratio between the serrated and remaining solid portions. Also, by changes of this nature it is now possible to provide a ring of uniform bending moment which is centrifugally balanced for high speed rotation. In prior rings having a decreasing section height the unequal distribution of weight causes centrifugal unbalance which is highly undesirable for high speed rotation. By variations in the configuration of the individual grooves and ridges, I am able to provide a ring which will be centrifugally balanced without change in the overall dimensions.

In Fig. 4, I have shown a typical installation of the internal type ring 10 within a groove 26 cut into the internal wall of a housing 27 or similar member. Ring 10 is of greater section height than the depth of groove 26 so as to project inwardly and abut the end face of a machine part 28. The ridges 23 or 24 on one face of ring 10 constitute shoulders which bear firmly against machine part 28 and hold it against axial movement. As can be appreciated, another ring 10 or other structural element abuts the opposite end of the machine part 28 so that it is held against axial displacement. The outer edge 12 and the adjoining solid rim portion of the ring seat within the groove 26 and bear firmly against the bottom wall thereof.

When an axial load is placed upon the machine part, there is both a shear and bending load upon the ring ridges 23 abutting thereon, and a compression load upon the housing 27 transmitted through the side wall of the groove 26. The thrust load capacity of the ring is of course dependent upon the area of ring available to shoulder against the machine part and is increased by the greater section height made possible. Likewise, the groove 26 may be of greater depth to increase the area of groove wall under compression, so that the compression load per square inch is decreased. This is particularly advantageous where the housing material is a light alloy casting or the like having a relatively limited compression load strength. Because such materials are frequently used in the aircraft industry, there is an increasing demand for a ring design permitting greater groove depth.

Still another advantage of the increased shoulder height is due to the fact that many types of machine parts 28 are necessarily provided with a filleted corner edge 29 which abuts the ring. This is the case in a conventional bearing race which for reasons of manufacture, are made with a filleted corner edge 29. It is apparent that a small shouldered ring will not seat against the flat face of the bearing race but will only bear ineffectively against the arcuate corner edge 29.

I have found that a conventional retaining ring of non-uniform section height does not bear against a bearing race around the entire periphery of the ring, but has as much as 25% of the ring length out of engagement with the bearing race for the reason just described. This reduces the effective thrust load capacity of the ring and also tends to cause lateral deformation or warping of the ring due to the uneven pressure. Utilizing my ring of increased shoulder height, there is enough shoulder to extend beyond a filleted corner and bear firmly against the face of the bearing race or the like. Furthermore, because the shoulder is of uniform height, the thrust load is distributed uniformly around the ring.

The preferred shape of the cantilevered ridges 23 and 24 as described, gives them the maximum resistance to bending as well as shear loads and also cooperates to increase the maximum load capacity of the rings. Thus, for all of the foregoing reasons, it may now be fully understood that a ring embodying my invention has a much greater thrust load capacity than prior rings, and may be designed to maintain circularity upon peripheral deflection without the disadvantages of the ring of non-uniform section height. Within the same overall dimensions, it is also possible to provide rings having varying degrees of flexibility and thrust load capacity for particular assemblies.

In Figs. 5 to 9, I have shown an embodiment of my invention designed as an external-type retaining ring 34. In general, the ring 34 is similar to the ring 10 but is adapted to seat within an external retaining groove formed in a shaft or the like, and has a different form of serrated rim. In this case, an inner peripheral edge or rim 35 bounds an annular wall portion of given thickness while an outer peripheral edge 36 is contiguous to a remaining portion of reduced wall thickness. Free end portions 37 and 38 are spaced apart slightly and are provided with tool sockets 39 for engagement with standard pliers or the like to expand the ring for installation.

The need for long-nose pliers or other special types of tools for the installation and removal of retaining rings has very often prevented their use on machines and equipment that is to be serviced in the field, and particularly in remote areas such as oil fields or farms. Using the extrusion process for the production of rings embodying my invention, it is quite practical to replace the conventional operating holes by the tool sockets 39. As is best seen in Fig. 8, the sockets 39 are each formed as a relatively large rectangular opening in one face of the ring having a flat bottom wall 40 and end walls 41 which are undercut downwardly to form inclined gripping lips. The sectional width of the sockets 39 and the depth of lips 41 are sufficient so that relatively large and strong plier jaws or the like may be easily seated therein.

Thus, the ring may be expanded for installation by the use of readily available hand tools.

Up to a certain size of ring, the gripping lips 41 are provided on only one face of the ring, as shown, but for larger rings made from heavier stock, a tool socket 39 may be formed on both faces of the ring.

The external ring 34 shown in Fig. 5, has the serrated portion in opposed position to that of the internal ring with an annular portion contiguous to the outer edge 36 having spaced serrations or grooves 44 and 45 extending radially therein on the opposite faces of the ring. Between the grooves 44 on one face, and the grooves 45 on the opposite face are ridges 46 and 47, respectively, so that a remaining wall portion 48 is of reduced thickness and sinusoidal or corrugated in nature. In this form of the invention the grooves 44 and 45 are all of the same length, and the uniform circumferential bending moment is achieved in a different manner than in the first-described form of the invention.

In accordance with aforementioned principles, it can be appreciated that I may increase the relative flexibility of the free ends of the ring by decreasing the wall thickness of the wall 48 defined by the grooves and ridges. As is seen in Fig. 6, the thickness of wall 48 is gradually decreased in the direction of the free end of the ring. This increases the relative flexibility in a corresponding manner, so that the desired uniform circumferential bending moment is provided upon peripheral deflection of the ring. In the external ring 34 the neutral axis of the ring is shifted toward the inner rim with a consequent decrease in the compression and tension loads on the solid portion upon deflection. Thus, the external ring may likewise have a greater ratio of section height to thickness as is desired. By the use of this form of my invention, I thus maintain the advantage which may flow from the provision of grooves of uniform depth, and at the same time provide a uniform circumferential bending moment.

In Fig. 7, I have shown an edge view of another form of my invention, in which the uniform bending moment is provided by changing the frequency or number of the serrations per unit of circumferential length, rather than the wall thickness or the radial depth of the serrations. It is to be understood, that the other characteristics of the ring are the same as those previously described. As shown, grooves 44a and 45a are formed in the opposite faces of the ring in staggered relationship. Between the grooves 44a and 45a are ridges 46a and 47a respectively, which complete the definition of a wall of reduced thickness 48a. Wall 48a is of uniform thickness, and the grooves and ridges are of uniform radial depth. However, by changing the number of grooves and ridges per unit of circumferential length, I am able to change the relative flexibility of the ring. As shown, the number of grooves and ridges increases toward the free end of the ring so that the pitch of the wall curvature changes progressively. The shape of the wall 48a is more nearly linear at the mid-section of the ring, and consequently it has a greater resistance to peripheral deflection. The ring may thus have a greater ratio of section height to thickness and provide the other aforementioned advantages.

In Fig. 9, the external type ring 34 is shown installed in an appropriate retaining groove 50 formed in the outer surface of a shaft 51. The solid inner rim 35 seats within groove 50 and the outer serrated portions extend outwardly to abut a machine part such as the bearing race 52. The ridges 46 or 47 about the entire periphery of the ring engage the end face of bearing race 52 so as to prevent axial movement of the latter. Because of the increased section height which is provided, there is sufficient shoulder height to extend outwardly beyond a filleted corner 53 formed on the bearing race. Thus, the reduction in load per square inch and the uniform distribution of load throughout the ring is effected by the use of the external ring as with the internal ring. Likewise, it can be understood that the other advantages set forth in connection with the internal ring are present in the external ring and need not be repeated.

A modified form of the internal ring is shown in Figs. 10 and 11. The body of a ring 60 is bonded by circular inner and outer edges 61 and 62, respectively. Extending radially in an annular portion contiguous to the edge 61 on the proposed faces of the ring are serrations or grooves 63 to provide an annular portion of reduced wall thickness profiled by the grooves and alternate ridges 64. In this form of the invention, the outer portion of the ring contiguous to the rim 62 is formed with a beveled face 66 which is outwardly convergent toward the opposite face so as to reduce the wall thickness at the edge and form an annular wedge.

The purpose of the wedge-shaped rim on the ring 60 is to provide a ring which will compensate for machining tolerances in bearing assemblies or the like and hold them firmly against end play. This type of wedge construction on a ring of decreasing section height is set forth in Patent No. 2,509,081 for Retaining Ring Assembly of L. S. Bluth et al. of May 23, 1950. Reference is made to said patent for a complete discussion of the objects and advantages to be gained by the provisions of a beveled rim. Basically, the groove wall is correspondingly inclined to the beveled face of the ring, and the latter wedges with a pressure fit against the abutting end of the machine part to overcome end play.

By the use of the present invention in a ring having such a beveled face, advantages of increased thrust load capacity and a greater amount of take-up are now possible. As is seen in Fig. 11, the ring 60 is installed within a groove 70 provided in the internal wall of a housing 71 or the like. The ridges 64 of the inner rim portion project outwardly beyond the groove 70 and shoulder against the end face of a typical machine part 72. The opposite end of machine part 72 may be held against another ring such as the type of ring 10 previously described. As can be appreciated, there are manufacturing tolerances in the length of machine part 72, the location of the groove 70, and the thickness of ring 60, which can only be held within certain limits. These tolerances act to create a condition in which the machine part may be free for a limited amount of axial movement or end play.

In order to avoid such end play a side wall 74 of groove 70 opposite the end of machine part 72 is formed on a taper or incline corresponding to the beveled face 66 of the ring. The groove and ring thickness or widths are selected to provide clearance between the straight side wall of the groove and the adjacent face of the retaining ring. This causes the ring 60 to exert pressure upon the abutting end of the machine part 72 through the range of manufacturing tolerances above-mentioned, and prevent end play in the assembly.

However, it can be appreciated that the thrust load capacity of the ring is determined by the area of contact surface between the beveled face 66 and the inclined groove wall 74. Furthermore, the groove depth, bevel angle, and length of the beveled face 66 determines the permissible amount of take-up. By the increased ratio of section height to thickness made practical through the use of my invention, it is now possible to provide a beveled ring having a greater thrust load capacity than before, and also a greater amount of axial take-up. The variations for greater thrust load capacity or take-up may be accomplished without changing the overall dimensions of the ring, and at the same time the relative flexibility of the ring may be changed by variations in the character and size of the serrated portion of the ring.

It is particularly advantageous to provide a uniform circumferential bending moment in the take-up ring as may be done by any of the forms of my invention previously described. Also, the use of a uniform section height throughout the ring insures that there will be an equal distribution of the take-up pressure exerted on the machine part. As can be understood, the use of my invention is not limited to the internal type of beveled ring described, but is equally advantageous upon the external type not shown.

In Figs. 12 through 17 I have illustrated a preferred form of apparatus and method for making rings of the kind described. As seen therein, the construction of the species of ring 10 shown in Figs. 1 through 4 of the drawings is explained. It will be apparent however, that similar apparatus and methods can be utilized to form the other species of rings shown in Figs. 5 through 11.

In forming the ring 10 it is highly desirable that no extensive amount of material be wasted as presently occurs in many blanking operations commonly used in making other types of retaining rings. To this end, the operation is started with an elongated linear strip of material 110 illustrated in phantom outline in Fig. 12. This stock 110 is of uniform rectangular cross section as is shown in Fig. 13, and is cut off in lengths corresponding to the peripheral length of the finished ring.

The ring blank 110 is first bent into a discontinuous circular shape of the desired radius. This is preferably done by a rolling operation so as to achieve exact circularity and assure even stressing of the material. As is seen in Fig. 12, three rollers are utilized to bend the ring blank 110, a center roller 111 driven by a central shaft 112 and two offset side rollers 113 and 114 which are mounted for rotation on idler shafts 115. By shifting the position of rollers 113 and 114 relative to roller 111, an adjustment can be made to form the blank 110 into a circular blank of any desired radius. Corresponding changes are made in the lengths of the initial linear blanks to provide the desired open arc between the open ends of the ring.

After the blank 110 has been rolled into the desired circularity, it is placed into a swaging die shown in Fig. 14. This die consists of mating upper and lower parts 120 and 121, respectively, which are adapted to define an annular cavity 122. The shape of cavity 122 is such that upon closing of the die the material along the inner peripheral edge of blank 110 is reduced in thickness and at the same time the radial width of the blank is increased. As is best seen in Fig. 15, the blank 110 after it leaves the swaging die has an outer peripheral portion 124 of rectangular cross section and an inner peripheral portion 125 of reduced thickness which is of minimum thickness along the inner edge and gradually increases in thickness towards the rectangular portion. It should be noted that the reduced portion 125 is not undulating or wavy as in the finished ring but is straight at this point in the operation.

Viewed in plan as is seen in Fig. 17 the blank 110 now has eccentric inner and outer edges. The outer peripheral portion 124 constitutes a band having a maximum width at the center of the ring and a minimum width at the open ends. The inner portion 125 has a minimum width at the center of the ring and a maximum at the open ends. It will be seen that since more material is reduced in thickness at the open ends of the inner portion 125 than at the center, there is a corresponding change in the radial width of the blank along its circumference, with the result that the inner peripheral edge of the ring becomes displaced eccentrically with respect to the outer peripheral edge. In order to form the finished ring 110 which has a uniform sectional width and concentric edges it is necessary to remove a part of portion 125 as is indicated by the area in shaded outline which is designated 126.

Removal of the excess material 126 may be accomplished in a trimming die as is illustrated in Fig. 15. Die 130 comprises an upper part 130 and lower part 131 which together define a cavity 132 adapted to receive blank 110. Along the inner peripheral edge of cavity 132 the die parts 130 and 131 have opposed shearing edges 135 which are so positioned as to cut the excess portion 126 away from the remainder of the ring blank 110. The resultant shape of blank 110 with the portion 126 removed is illustrated in the sectional view Fig. 16.

Thus far I have described the manufacture of the ring by means of two separate die operations for swaging and trimming. It is to be understood, however, that these operations may be performed in a combined swaging and trimming die to accomplish the same result. It is also to be understood, that swaging is not the only operation by which the reduced portion of the ring may be profile formed. Such profile forming and reduction in the thickness of the ring may also be accomplished by means of a milling operation combined with a trimming step to achieve the desired eccentricity of the reduced portion.

To complete the formation of blank 110 into the finished ring 10 it is necessary to bend the reduced portion 125 into the sinusoidal wall 22 which is defined by the serrations 21 and 21 in the shape as previously described. This is again done by swaging or stamping dies, similar to those previously described, and having alternate groove and ridger portions complemental to the shape of the completed ring. Figures 18 and 19 illustrate the finished ring 10 which, as can be understood, is the same as that shown in Figs. 1 through 4. It will thus be seen, that by forming the ring 10 in the manner described I am able to use a minimum amount of material and to form the ring in a series of relatively simple operational steps.

In setting forth my invention, I have described in detail specific embodiments for illustrative purposes, without reference to the method of construction of the ring. I wish it to be understood that the method of forming the one form of ring is equally adaptable to forming the other specific types of rings. Likewise, there are changes and modifications of design which will be apparent to those skilled in the art, and I do not desire to be limited by the foregoing details of description, except as defined in the appended claims.

I claim:

1. A flat spring retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edge having a wavy undulating bellow-like wall of reduced thickness relative to the remainder of said ring and increased peripheral flexibility lying between the planes of said side faces and formed by the provision of alternately staggered grooves and ridges extending radially across said portion whereby to shift the neutral axis of said ring away from said one edge.

2. A retaining ring as defined in claim 1 wherein the portion of reduced thickness extends away from the outer edge of the ring.

3. A retaining ring as defined in claim 1 wherein the portion of reduced thickness extends away from the inner edge of the ring.

4. A flat spring-retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edge having a wavy undulating bellow-like wall of reduced thickness relative to the remainder of said ring and increased peripheral flexibility lying between the planes of said side faces and formed by the provision of alternately staggered grooves and ridges extending radially across said portion, each of said ridges being sectionally internally profiled to form a cantilevered beam having its greatest thickness at the root and gradually diminishing in thickness towards the tip, said increased flexibility of said portion causing a shift in the neutral axis of said ring away from said one edge.

5. A flat spring-retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edge having a wavy undulating bellow-like wall of reduced thickness relative to the remainder of said ring and increased peripheral flexibility lying between the planes of said side faces and formed by the provision of alternately staggered grooves and ridges extending radially across said portion, whereby to shift the neutral axis of said ring away from said one edge, the length of said ridges and grooves progressively increasing from the middle section to the free ends of said ring, whereby said ring maintains circularity upon deformation.

6. A flat spring-retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edge having a wavy undulating bellow-like wall of reduced thickness relative to the remainder of said ring and increased peripheral flexibility lying between the planes of said side faces and formed by the provision of alternately staggered grooves and ridges extending radially across said portion, whereby to shift the neutral axis of said ring away from said one edge, the wall thickness of said portion progressively diminishing from the middle section to the free ends of said ring, whereby said ring maintains circularity upon deflection.

7. A flat spring-retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edges having a wavy undulating bellow-like wall of reduced thickness relative to the remainder of said ring and increased peripheral flexibility lying between the planes of said side faces and formed by the provision of alternately staggered grooves and ridges extending radially across said portion, whereby to shift the neutral axis of said ring away from said one edge, the number of said grooves and ridges per unit of circumferential length progressively increasing from the middle section to the free ends of the ring, whereby said ring maintains circularity upon deflection.

8. A flat spring-retaining ring of greater radial width than thickness comprising a discontinuous annular member of circumferential extent more than 180° and having substantially concentric circular inner and outer edges and side faces, a portion of said ring of considerable width including one of said edges extending away from said one edge towards the other edge having a wavy undulating bellow-like wall of reduced thickness relative to the remainder of said ring and increased peripheral flexibility lying between the planes of said side faces and formed by the provision of alternately staggered grooves and ridges and extending radially across said portion whereby to shift the neutral axis of said ring away from said one edge, one face of said ring having a surface which slopes towards the opposite face to reduce the thickness of said other edge of said ring to form an annular wedge member.

9. A retaining ring as defined in claim 1 wherein the free ends of the ring have tool sockets in at least one face thereof formed with a flat end lip for gripping engagement with the jaws of conventional pliers.

References Cited in the file of this patent

UNITED STATES PATENTS

| | | |
|---|---|---|
| 2,141,576 | Warr et al. | Dec. 27, 1938 |
| 2,544,531 | Heimann et al. | Mar. 6, 1951 |
| 2,660,913 | Frisby | Dec. 1, 1953 |
| 2,616,805 | Reed | Sept. 6, 1955 |